(12) United States Patent
Tseng et al.

(10) Patent No.: US 8,409,728 B2
(45) Date of Patent: Apr. 2, 2013

(54) ORGANIC ELECTROLUMINESCENCE DEVICE

(75) Inventors: Shih Pin Tseng, Hsinchu County (TW); Ming Lei Chen, Kaohsiung County (TW); Cheng Feng Su, Yilan County (TW)

(73) Assignee: Ritdisplay Corporation, Hsin Chu Industrial Park (TW)

( * ) Notice: Subject to any disclaimer, the term of this patent is extended or adjusted under 35 U.S.C. 154(b) by 304 days.

(21) Appl. No.: 12/859,594

(22) Filed: Aug. 19, 2010

(65) Prior Publication Data

US 2011/0073845 A1      Mar. 31, 2011

(30) Foreign Application Priority Data

Sep. 28, 2009   (TW) .............................. 98132656 A

(51) Int. Cl.
*H01L 51/54* (2006.01)
(52) U.S. Cl. ........ 428/690; 428/917; 313/504; 313/505; 313/506; 257/E51.5; 257/E51.026; 257/E51.032; 585/7; 564/26; 564/426; 564/434
(58) Field of Classification Search .................. 428/690, 428/917; 313/504, 505, 506; 257/40, E51.05, 257/E51.026, E51.032; 585/27; 564/26, 564/426, 434
See application file for complete search history.

(56) References Cited

U.S. PATENT DOCUMENTS 6,815,090 B1    11/2004   Tagami et al.

FOREIGN PATENT DOCUMENTS

JP        2003272863       9/2003

*Primary Examiner* — Jennifer Chriss
*Assistant Examiner* — Gregory Clark
(74) *Attorney, Agent, or Firm* — WPAT, P.C.; Anthony King

(57) ABSTRACT

An organic electroluminescence device includes an organic layer disposed between at least one pair of electrodes, wherein the organic layer includes at least one fluorescent compound selected from compounds represented by the following general formulae (1) and (2):

(1)

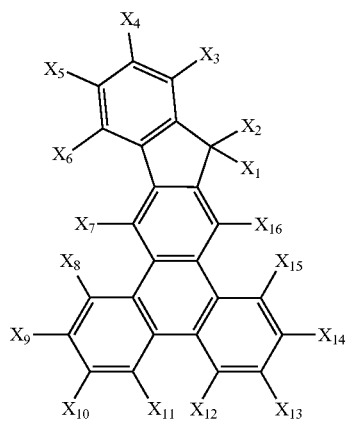

(2)

wherein $X_1$ to $X_{16}$ each independently represents a hydrogen atom, a linear, branched or cyclic alkyl group having 1 to 20 carbon atoms, a linear, branched or cyclic alkoxy group having 1 to 20 carbon atoms, a substituted or unsubstituted aryl group having 6 to 30 carbon atoms, a substituted or unsubstituted aryloxy group having 6 to 30 carbon groups, a substituted or unsubstituted arylamino group having 6 to 30 carbon atoms, a substituted or unsubstituted alkylamino group having 1 to 30 carbon atoms, a substituted or unsubstituted arylalkylamino group having 7 to 30 carbon atoms or a substituted or unsubstituted alkenyl group having 8 to 30 carbon atoms; a pair of adjacent groups represented by $X_1$ to $X_2$ and a pair of adjacent substituents to groups represented by $X_1$ to $X_2$ may form a cyclic structure in combination; a pair of adjacent groups represented by $X_3$ to $X_{16}$ and a pair of adjacent substituents to groups represented by $X_3$ to $X_{16}$ may form a cyclic structure in combination; when the pair of adjacent substituents are aryl groups, the pair of substituents may be a single group; and in the formulae at least one of the substituents of $X_3$ to $X_{14}$ or $X_{16}$ includes amino group.

8 Claims, 1 Drawing Sheet

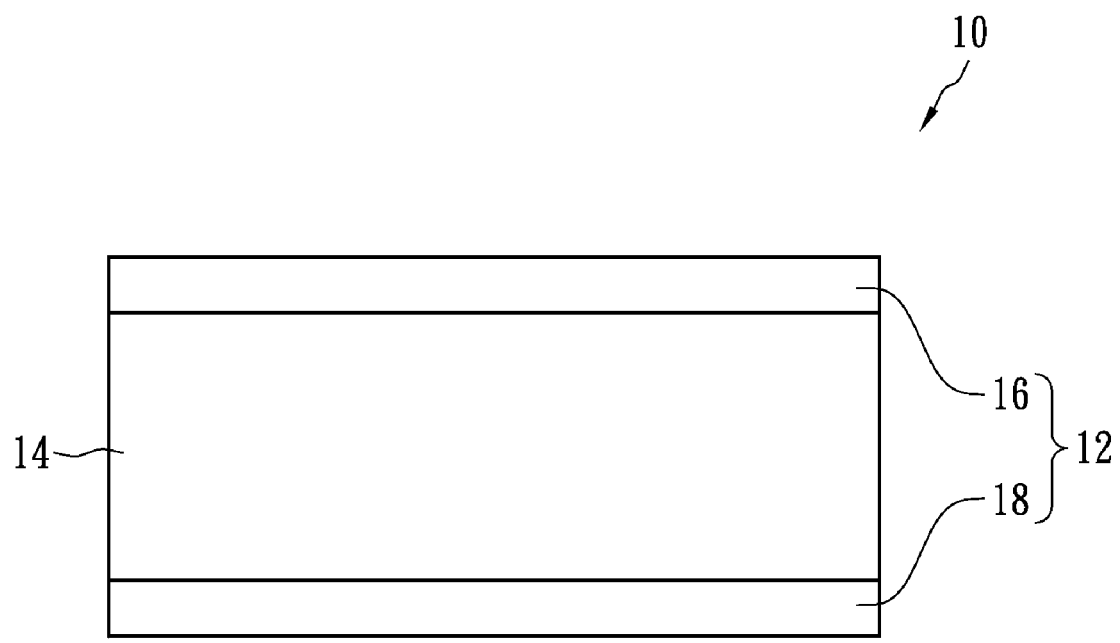

ORGANIC ELECTROLUMINESCENCE DEVICE

BACKGROUND OF THE INVENTION (A) Field of the Invention

The present invention relates to an organic electroluminescence (EL) device, and particularly to an organic electroluminescence device of aromatic amine derivative.

(B) Description of the Related Art

Electroluminescence is a lighting phenomenon in which currents flow through a material or a material is disposed in high-voltage electrical fields. Electroluminescence is also known in industry as "cold light." Electroluminescence devices may be zinc sulfide and blue diamond doped with copper or silver. Current development efforts in the electroluminescence field are focused on the application of organic materials.

Organic light-emitting diodes (OLED) with electroluminescence features use display technologies in which light is generated by current-driven organic semiconductor materials and lighting materials, so as to display images. In comparison with liquid crystal displays (LCD), the organic light-emitting diodes (OLED) have advantages such as light weight, thin profile (less than 1 mm), high brightness, large viewing angle (up to 170 degrees), no need for backlight, low power consumption, quick response, clear image display, low heat generation, vibration resistance, low manufacturing cost and bendability.

However, because electroluminescence devices do not have backlight units, they must include a self-contained light source. Therefore, the light efficiency of an electroluminescence device is quite important, and aggressive research is presently underway to develop improvements in such efficiency.

Japanese Patent JP3929337 (Pub. No. 2003-272863) discloses fluorescent compounds of aromatic amine derivative with green to yellow colors, of which the highest lighting efficiency is 6.5 cd/A. U.S. Pat. No. 6,815,090 discloses fluorescent compounds of aromatic amine derivative with yellow-green to red colors, of which the highest lighting efficiency is 6.7 cd/A.

The aromatic amine derivatives disclosed in U.S. Pat. No. 6,815,090 do not have sufficient lighting efficiency. For the application of passive matrix organic light-emitting diode (PMOLED) products, increased lighting efficiency is crucial to improving brightness and reducing the power consumption of products.

SUMMARY OF THE INVENTION

The present invention provides an organic electroluminescence (EL) device for use in panel displays with high luminance efficiency, in which main structures of the aromatic amine derivatives are changed, so as to significantly improve the luminance efficiency of the light-emitting materials.

According to one embodiment of the present invention, an organic electroluminescence device includes at least one pair of electrodes and an organic layer disposed between the pair of electrodes. The organic layer includes at least one fluorescent compound selected from compounds represented by the following general formulae (1) and (2):

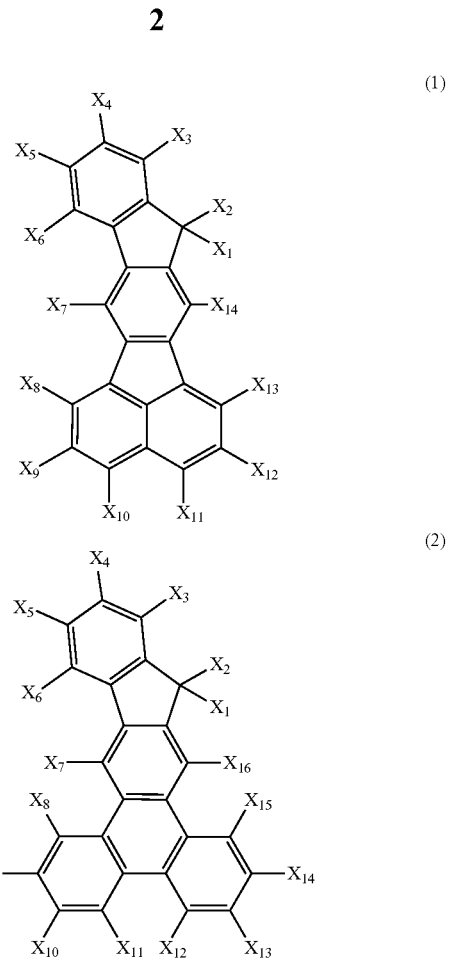

wherein $X_1$ to $X_{16}$ each independently represents a hydrogen atom, a linear, branched or cyclic alkyl group having 1 to 20 carbon atoms, a linear, branched or cyclic alkoxy group having 1 to 20 carbon atoms, a substituted or unsubstituted aryl group having 6 to 30 carbon atoms, a substituted or unsubstituted aryloxy group having 6 to 30 carbon groups, a substituted or unsubstituted arylamino group having 6 to 30 carbon atoms, a substituted or unsubstituted alkylamino group having 1 to 30 carbon atoms, a substituted or unsubstituted arylalkylamino group having 7 to 30 carbon atoms or a substituted or unsubstituted alkenyl group having 8 to 30 carbon atoms; a pair of adjacent groups represented by $X_1$ and $X_2$ and a pair of adjacent substituents to groups represented by $X_1$ and $X_2$ may form a cyclic structure in combination; a pair of adjacent groups represented by $X_3$ to $X_{16}$ and a pair of adjacent substituents to groups represented by $X_3$ to $X_{16}$ may form a cyclic structure in combination; when the pair of adjacent substituents to groups represented by $X_1$ and $X_2$ or groups represented by $X_3$ to $X_{16}$ are aryl groups, the pair of adjacent substituents may be a single group; and in the formulae (1) and (2) at least one of the substituents of $X_3$ to $X_{14}$ or $X_{16}$ includes amino group.

In comparison with low luminance efficiency of the devices of prior arts, the present invention can provide an organic electroluminescence device with similar colors and better luminance efficiency.

BRIEF DESCRIPTION OF THE DRAWINGS

FIG. 1 shows an organic electroluminescence device in accordance with an embodiment of the present invention.

DETAILED DESCRIPTION OF THE INVENTION

The making and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In order to resolve the low luminance efficiency problem, the main structure of the aromatic amine derivative of the fluorescent compound is changed, so as to significantly improve the luminance efficiency of the light-emitting material which is applied to an organic electroluminescence device.

FIG. 1 shows an organic electroluminescence device 10 in accordance with an embodiment of the present invention. The organic electroluminescence device 10 includes at least one pair of electrodes 12 and an organic layer 14. The pair of electrodes 12 includes a first electrode 16 and a second electrode 18. The organic layer 14 is disposed between the first electrode 16 and the second electrode 18.

The organic layer 14 includes at least one fluorescent compound selected from compounds represented by the following general formulae (1) and (2):

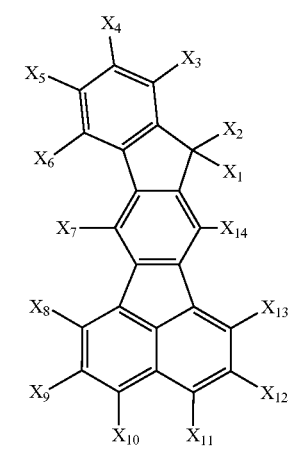

(1)

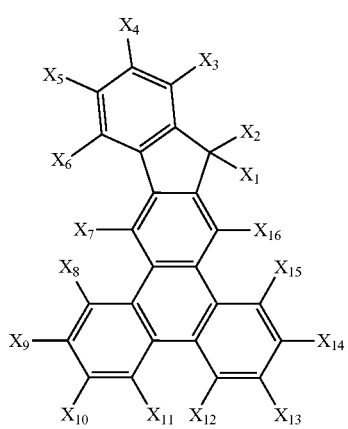

(2)

wherein $X_1$ to $X_{16}$ each independently represents a hydrogen atom, a linear, branched or cyclic alkyl group having 1 to 20 carbon atoms, a linear, branched or cyclic alkoxy group having 1 to 20 carbon atoms, a substituted or unsubstituted aryl group having 6 to 30 carbon atoms, a substituted or unsubstituted aryloxy group having 6 to 30 carbon groups, a substituted or unsubstituted arylamino group having 6 to 30 carbon atoms, a substituted or unsubstituted alkylamino group having 1 to 30 carbon atoms, a substituted or unsubstituted arylalkylamino group having 7 to 30 carbon atoms or a substituted or unsubstituted alkenyl group having 8 to 30 carbon atoms; a pair of adjacent groups represented by $X_1$ and $X_2$ and a pair of adjacent substituents to groups represented by $X_1$ and $X_2$ may form a cyclic structure in combination; a pair of adjacent groups represented by $X_3$ to $X_{16}$ and a pair of adjacent substituents to groups represented by $X_3$ to $X_{16}$ may form a cyclic structure in combination; when the pair of adjacent substituents are aryl groups, the pair of adjacent substituents may be a single group; and in the formulae at least one of the substituents of $X_3$ to $X_{14}$ or $X_{16}$ includes amino group.

More specifically, formula (1) is related to a compound including a fluoranthene structure with substituted amino group.

In an embodiment, at least one of the substituents of $X_4$, $X_{10}$ and $X_{11}$ of formula (1) includes amino group.

In another embodiment, at least one of the substituents of $X_4$, $X_9$, $X_{10}$, $X_{13}$ and $X_{14}$ of formula (2) includes amino group.

In a further embodiment, in formulae (1) and (2), $X_1$ and $X_2$ each independently represents a linear, branched or cyclic alkyl group having 1 to 20 carbon atoms, or a substituted or unsubstituted aryl group having 6 to 30 carbon atoms; and a pair of adjacent groups represented by $X_1$ and $X_2$ and a pair of adjacent substituents to groups represented by $X_1$ and $X_2$ may form a cyclic structure in combination.

These embodiments can be but are not required to be applied to yellow or white light devices.

Experimental test results of fluorescent compounds of the present invention are exemplified below, so as to show the realized improvements in luminance efficiency.

FIRST EMBODIMENT

Y1 shows a fluorescent compound in accordance with a first embodiment of the present invention.

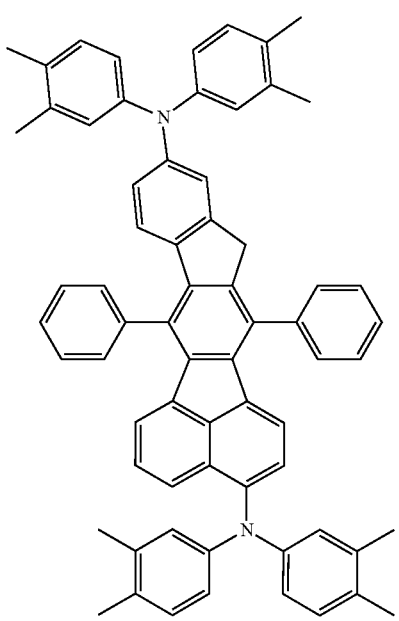

Y1

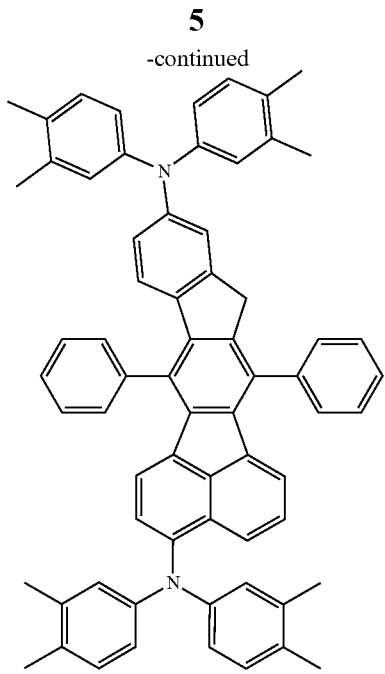

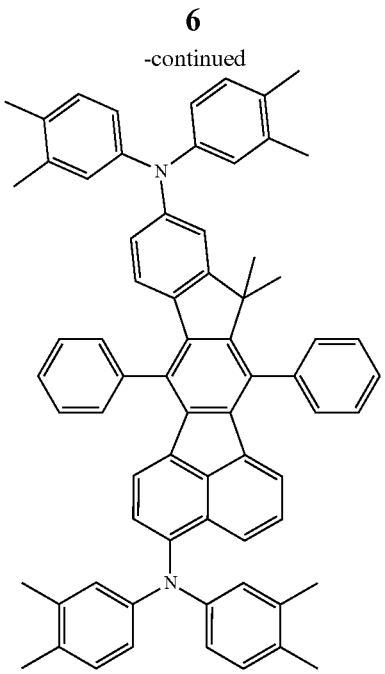

The organic electroluminescence device may be manufactured as follows:

First, a glass substrate is provided, and an indium tin oxide (ITO) layer of 150 nm is disposed on the glass substrate with an area of 100 mm×100 mm. After forming a pattern on the 10 mm×10 mm lighting area by lithography, the device is subjected to vacuum evaporation deposition at $10^{-5}$ Pa, so as to form a hole transporting layer NPB (N,N'-bis-(1-naphthyl)-N,N'-diphenyl-(1,1'-biphenyl)-4,4'-diamine) of 65 nm with a deposition rate of 0.2 nm/sec. Next, ADN ((9,10-Di(naphth-2-yl)anthracene) and Y1 are deposited to form an light-emitting layer of 40 nm, in which compound Y1 is 4% of ADN, and the vapor deposition rate is 0.2 nm/sec. Next, AlQ3 (tris (8-quinolino)aluminum) is deposited as an electron transporting layer of 15 nm with a vapor deposition rate of 0.2 nm/sec. Lastly, lithium fluoride with a thickness of 1.2 nm and aluminum with thickness of 150 nm are deposited as cathodes.

EMBODIMENT 2

Y2 shows a fluorescent compound in accordance with a second embodiment of the present invention.

The organic electroluminescence device is manufactured according to the method of that shown in Embodiment 1, but with Y1 replaced by Y2.

EMBODIMENT 3

Y3 shows a fluorescent compound in accordance with a third embodiment of the present invention:

Y2

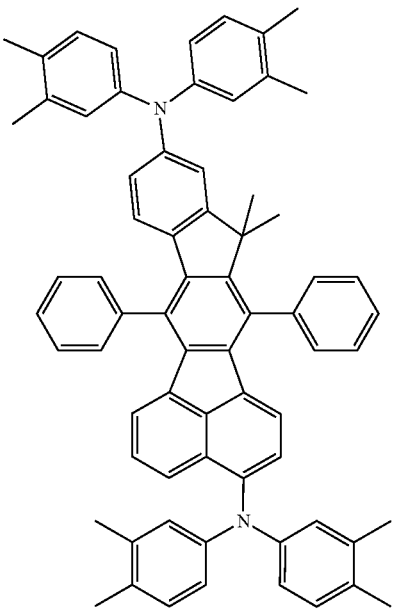

Y3

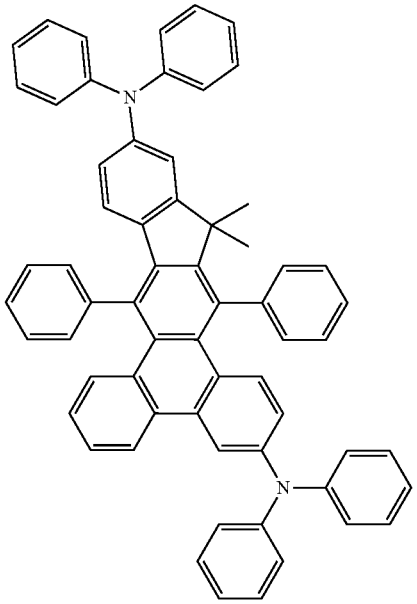

-continued

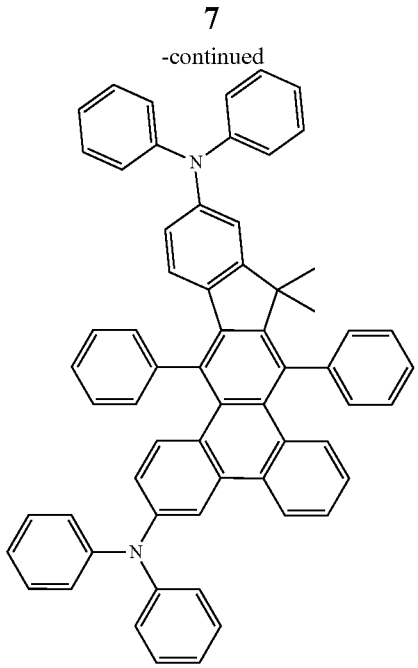

The organic electroluminescence device is manufactured according to the method for that shown in Embodiment 1, but with Y1 replaced by Y3.

COMPARISON EXAMPLE

Y0 is a traditional fluorescent compound.

Y0

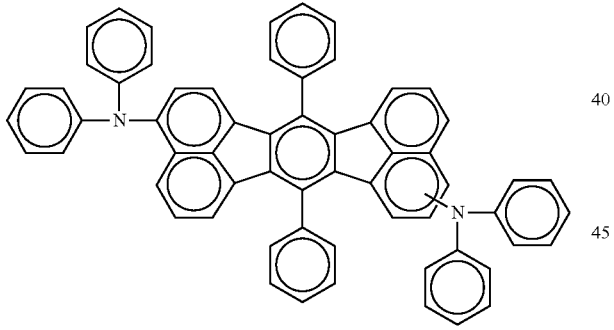

The organic electroluminescence device is manufactured according to the method for that shown in Embodiment 1, in which Y1 is replaced by Y0, and compound Y0 is 2% of ADN.

The organic electroluminescence devices including Y0, Y1, Y2 and Y3 are tested under 10000 nits. The comparison results are shown in Table 1, where cd/A is candela/ampere, and CIEx and CIEy are Commission Internationale d'Eclairage coordinates x and y.

TABLE 1

|  |  | cd/A | CIEx | CIEy |
|---|---|---|---|---|
| Embodiment 1 | Y1 | 13.7 | 0.46 | 0.51 |
| Embodiment 2 | Y2 | 13.6 | 0.47 | 0.50 |
| Embodiment 3 | Y3 | 12.6 | 0.41 | 0.55 |
| Comparison Example | Y0 | 8.7 | 0.49 | 0.49 |

In Table 1, CIEx and CIEy of the fluorescent compounds Y1, Y2, Y3 and Y0 are not significantly different; nevertheless, the cd/A values of Y1, Y2, Y3 are significantly larger than that of Y0. In other words, the fluorescent compounds Y1, Y2, Y3 can effectively increase luminance efficiency.

The above-described embodiments of the present invention are intended to be illustrative only. Numerous alternative embodiments may be devised by those skilled in the art without departing from the scope of the following claims.

What is claimed is:
1. An organic electroluminescence device, comprising:
at least one pair of electrodes; and
an organic layer disposed between the pair of electrodes, comprising at least one fluorescent compound represented by the following general formulae (1) and (2):

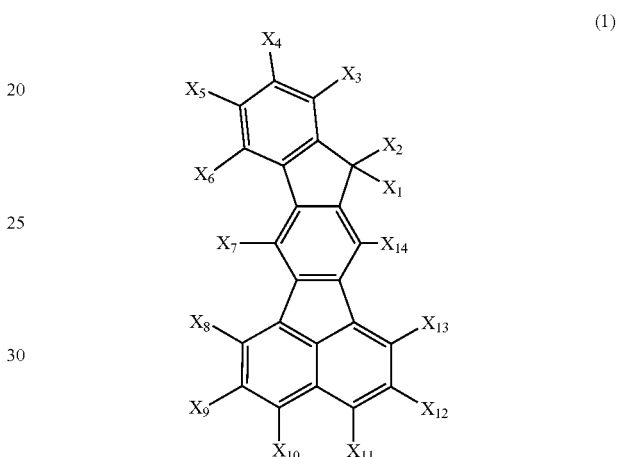

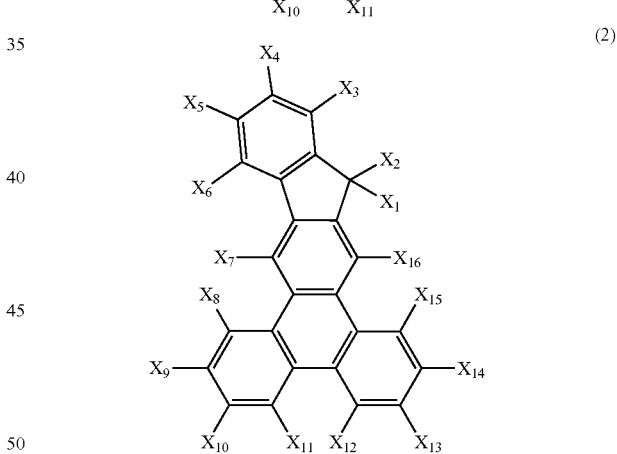

wherein $X_1$ to $X_{16}$ each independently represents hydrogen atom, a linear, branched or cyclic alkyl group having 1 to 20 carbon atoms, a linear, branched or cyclic alkoxy group having 1 to 20 carbon atoms, a substituted or unsubstituted aryl group having 6 to 30 carbon atoms, a substituted or unsubstituted aryloxy group having 6 to 30 carbon groups, a substituted or unsubstituted arylamino group having 6 to 30 carbon atoms, a substituted or unsubstituted alkylamino group having 1 to 30 carbon atoms, a substituted or unsubstituted arylalkylamino group having 7 to 30 carbon atoms or a substituted or unsubstituted alkenyl group having 8 to 30 carbon atoms; and in the formulae (1) and (2) at least one of the substituents of $X_3$ to $X_{14}$ or $X_{16}$ includes amino group.
2. The organic electroluminescence device of claim 1, wherein at least one of the substituents for $X_4$, $X_{10}$ and $X_{11}$ in formula (1) comprises amino group.

3. The organic electroluminescence device of claim 1, wherein at least one of the substituents for $X_4$, $X_9$, $X_{10}$, $X_{13}$ and $X_{14}$ in formula (2) comprises amino group.

4. The organic electroluminescence device of claim 1, wherein in formulae (1) and (2), $X_1$ and $X_2$ each independently represents a linear, branched or cyclic alkyl group having 1 to 20 carbon atoms, a substituted or unsubstituted aryl group having 6 to 30 carbon atoms.

5. The organic electroluminescence device of claim 1, wherein in formulae (1) and (2), a pair of adjacent groups represented by $X_1$ and $X_2$ and a pair of adjacent substituents to groups represented by $X_1$ and $X_2$ form a cyclic structure in combination.

6. The organic electroluminescence device of claim 1, wherein in formulae (1) and (2), a pair of adjacent groups represented by $X_3$ to $X_{16}$ and a pair of adjacent substituents to groups represented by $X_3$ to $X_{16}$ form a cyclic structure in combination.

7. The organic electroluminescence device of claim 5, wherein when the pair of adjacent substituents to groups represented by $X_1$ and $X_2$ are aryl groups, the pair of adjacent substituents is a single group.

8. The organic electroluminescence device of claim 6, wherein when the pair of adjacent substituents to groups represented by $X_3$ to $X_{16}$ are aryl groups, the pair of adjacent substituents is a single group.

* * * * *